(12) United States Patent
Ellison et al.

(10) Patent No.: US 8,598,056 B2
(45) Date of Patent: Dec. 3, 2013

(54) ALKALI-FREE GLASS COMPOSITIONS HAVING HIGH THERMAL AND CHEMICAL STABILITY

(75) Inventors: Adam J. Ellison, Painted Post, NY (US); Timothy J. Kiczenski, Corning, NY (US)

(73) Assignee: Corning Incorporated, Corning, NY (US)

( * ) Notice: Subject to any disclaimer, the term of this patent is extended or adjusted under 35 U.S.C. 154(b) by 87 days.

(21) Appl. No.: 13/251,496

(22) Filed: Oct. 3, 2011

(65) Prior Publication Data

US 2012/0088648 A1 Apr. 12, 2012

Related U.S. Application Data

(60) Provisional application No. 61/390,406, filed on Oct. 6, 2010, provisional application No. 61/497,295, filed on Jun. 15, 2011.

(51) Int. Cl.
*C03C 3/091* (2006.01)

(52) U.S. Cl.
USPC .............. 501/66; 501/56; 501/59; 501/64

(58) Field of Classification Search
USPC .................... 501/56, 59, 64, 66, 67
See application file for complete search history.

(56) References Cited

U.S. PATENT DOCUMENTS

| | | | |
|---|---|---|---|
| 3,338,696 A | 8/1967 | Dockerty | 65/145 |
| 3,682,609 A | 8/1972 | Dockerty | 65/83 |
| 5,244,847 A | 9/1993 | Kushitani et al. | 501/66 |
| 5,348,916 A | 9/1994 | Kushitani et al. | 501/66 |
| 5,489,558 A | 2/1996 | Moffatt et al. | 501/69 |
| 5,801,109 A | 9/1998 | Nishizawa et al. | 501/66 |
| 5,811,361 A | 9/1998 | Miwa | 501/70 |
| 5,851,939 A | 12/1998 | Miwa | 501/70 |
| 6,329,310 B1 | 12/2001 | Peuchert et al. | 501/66 |
| 7,534,734 B2 * | 5/2009 | Ellison | 501/66 |
| 7,670,975 B2 | 3/2010 | Suzuki et al. | 501/66 |
| 7,833,919 B2 | 11/2010 | Danielson et al. | 501/66 |
| 7,935,649 B2 * | 5/2011 | Ellison | 501/66 |
| 2002/0151426 A1 | 10/2002 | Murata et al. | 501/66 |
| 2009/0294773 A1 * | 12/2009 | Ellison | 257/72 |
| 2011/0048074 A1 | 3/2011 | Danielson et al. | 65/90 |
| 2011/0098172 A1 | 4/2011 | Brix | 501/57 |
| 2011/0143908 A1 * | 6/2011 | Koyama et al. | 501/66 |

FOREIGN PATENT DOCUMENTS

| | | |
|---|---|---|
| DE | 198 51 927 | 2/2001 |
| EP | 0 714 862 | 6/1996 |
| EP | 1 878 709 | 1/2008 |
| JP | 61-295256 | 12/1986 |
| JP | 09-048632 | 2/1997 |
| WO | 2008/028599 | 3/2008 |

* cited by examiner

*Primary Examiner* — Karl Group
(74) *Attorney, Agent, or Firm* — Maurice M. Klee; Thomas R. Beall

(57) ABSTRACT

Described herein are alkali-free, boroalumino silicate glasses exhibiting desirable physical and chemical properties for use as substrates in flat panel display devices, such as, active matrix liquid crystal displays (AMLCDs). In accordance with certain of its aspects, the glasses possess good dimensional stability as a function of temperature.

13 Claims, 2 Drawing Sheets

ALKALI-FREE GLASS COMPOSITIONS HAVING HIGH THERMAL AND CHEMICAL STABILITY

CROSS-REFERENCE TO RELATED APPLICATIONS

This application claims the benefit of priority under 35 U.S.C. §119 of U.S. Provisional Application Ser. No. 61/390,406 filed on Oct. 6, 2010, and U.S. Provisional Application Ser. No. 61/497,295, filed on Jun. 15, 2011, the contents of which are hereby incorporated.

BACKGROUND

The production of liquid crystal displays such as, for example, active matrix liquid crystal display devices (AMLCDs) is very complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors. P-Si displays are at the core of state-of-the-art handheld devices. The polysilicon thin film transistor array consumes very low power, permits very fine features (critical for small displays), and provides high brightness.

The process used to make polysilicon TFTs invariably includes a thermal excursion to quite high temperature to encourage the silicon to crystallize. In some processes, temperature alone is used to produce crystallization, and in such processes the peak temperatures are very high, very typically greater than 650° C. compared to the 350° C. peak temperatures employed in the manufacture of a-Si transistors. At these temperatures, most AMLCD glass substrates undergo a process known as compaction and will deform excessively unless supported from below. Compaction, also referred to as thermal stability or dimensional change, is an irreversible dimensional change (shrinkage or expansion) in the glass substrate due to changes in the glass' fictive temperature. The magnitude of compaction depends both on the process by which a glass is made and the viscoelastic properties of the glass. In the float process for producing sheet products from glass, the glass sheet is cooled relatively slowly from the melt and, thus, "freezes in" a comparatively low temperature structure into the glass. The fusion process, by contrast, results in very rapid quenching of the glass sheet from the melt, and freezes in a comparatively high temperature structure. As a result, a glass produced by the float process possesses less compaction when compared to glass produced by the fusion process. In the glass product itself, the compaction ultimately may produce poor registry with the color filter and, if large enough, adversely affect device performance. Thus, it would be desirable to minimize the level of compaction in a glass substrate that is produced by a downdraw process. A commercial glass product, Jade™ (Corning Incorporated, Corning N.Y.), was developed expressly to address this problem. It has a very high annealing point compared to conventional amorphous silicon substrate glasses, and thus shows low compaction even when reheated above the strain point of conventional amorphous silicon substrates.

Laser recrystallization was developed to avoid the very high temperature step of conventional p-Si processes. In this process, the substrate is still heated to elevated temperature, but a laser is used to assist in crystallization via very localized heating. This allows for processing at lower absolute temperature for shorter periods of time, thus reducing cost and increasing throughput. Laser recrystallization can be used to produce state-of-the-art p-Si displays with low power consumption, high resolution and high brightness. There are also lower-temperature p-Si processes that can be used for less demanding applications. In these, either the hold time at peak temperature is much shorter than for a high-resolution p-Si display, or the peak temperature is much reduced with a longer hold time, or with nucleating agents added to the silicon to enhance crystallization and growth. Even with this lower peak process temperature and time, a-Si substrates made via the normal fusion process show excessive compaction. While draw speed can be reduced to lower the fictive temperature, and thus enhance compaction performance, this significantly reduces through-put and thus substantially increases the cost of producing the would-be p-Si substrate.

The very high anneal point of Jade™ is much higher than would be required to produce acceptable compaction for these applications. Furthermore, the visco-elastic properties of Jade™ result in high production costs, and thus it may become prohibitively expensive to use in these applications. Even if process adjustments could be used to drive manufacturing costs down, Jade™ has quite high density compared to conventional amorphous silicon substrates (2.63 g/cc vs. 2.38-2.55 g/cc), and very different acid durability than conventional a-Si substrates. As a result, an AMLCD panel manufacturer who wants to chemically thin Jade™ to compensate for its high density cannot do so in a conventional chemical thinning process designed for a-Si substrates. This adds to the panel manufacturing costs.

What is desired is a fusion-compatible glass with an annealing point between an a-Si substrate (~720° C.) and Jade™ (~785° C.) with a density and acid durability comparable to mainstream a-Si substrate products.

SUMMARY

In accordance with the purposes of the disclosed materials, compounds, compositions, articles, devices, and methods, as embodied and broadly described herein are alkali-free, boroalumino silicate glasses exhibiting desirable physical and chemical properties for use as substrates in flat panel display devices, such as, active matrix liquid crystal displays (AMLCDs). In accordance with certain of its aspects, the glasses possess good dimensional stability as a function of strain point. Specifically, the glasses described herein are fusion-compatible glasses with an anneal point in excess of 750° C., with a temperature at 200 poise of 1650° C. or less, with a density less than 2.55 g/cc, and with etch rates in fluoride-based mineral acids within 10% of the range exhibited by conventional a-Si substrate materials. Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

DETAILED DESCRIPTION

Figure 1:
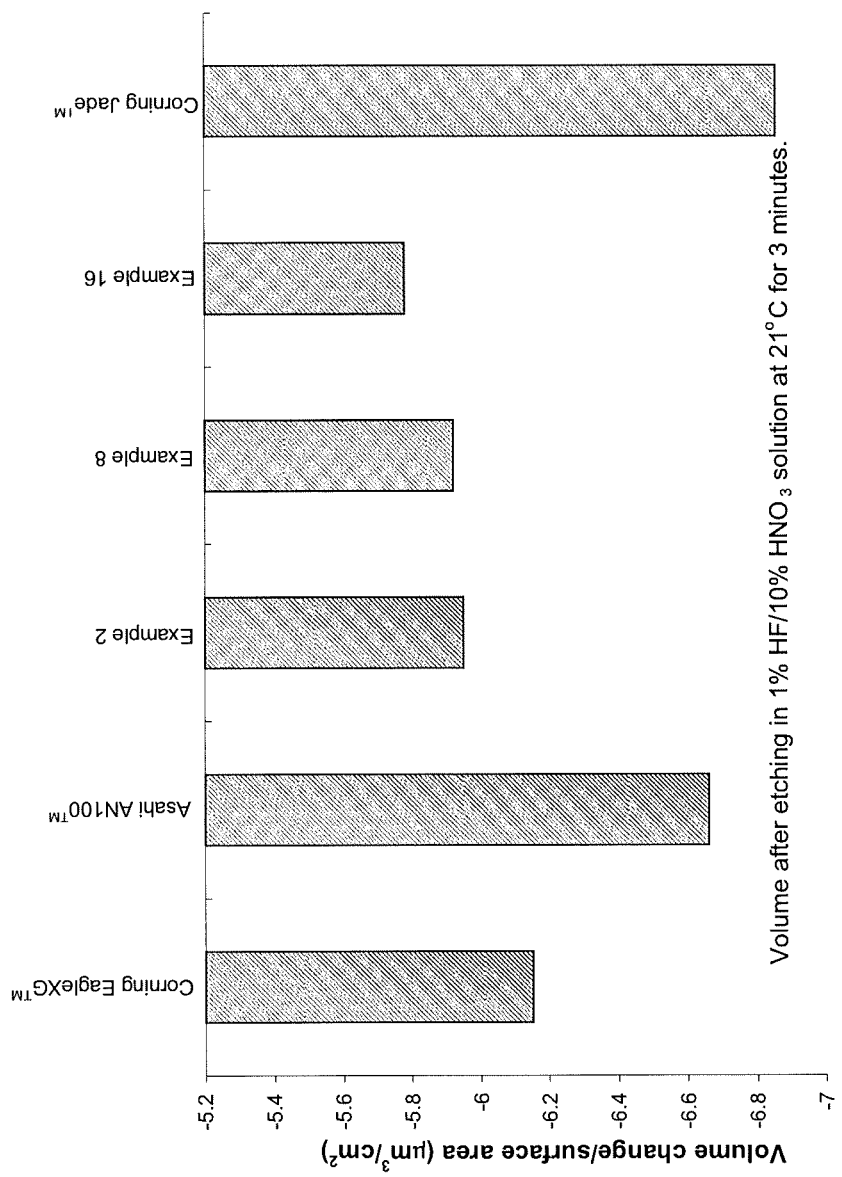
FIG. 1 shows the change per unit area after etching in 1% HF/10% $HNO_3$ for 3 minutes at room temperature (21° C.). Glasses of the present disclosure are compared to commercially available glasses sold for both a-Si as well as p-Si applications.

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting. Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Throughout the description and claims of this specification the word "comprise" and other forms of the word, such as "comprising" and "comprises," means including but not limited to, and is not intended to exclude, for example, other additives, components, integers, or steps.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers or prepared by methods known to those skilled in the art.

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Reference will now be made in detail to specific aspects of the disclosed materials, compounds, compositions, articles, and methods, examples of which are illustrated in the accompanying Examples and Figures.

Described herein are alkali-free glasses and methods for making the same that possess high strain points and, thus, good dimensional stability (i.e., low compaction). A high strain point glass can prevent panel distortion due to compaction/shrinkage during thermal processing subsequent to manufacturing of the glass.

The compositions represented by ranges of the present disclosure comprise $SiO_2$, $Al_2O_3$, $B_2O_3$, MgO, CaO, SrO and BaO, and fining agents may include tin oxide ($SnO_2$), iron oxide ($Fe_2O_3$), cerium oxide ($CeO_2$) various halides (principally F, Cl and Br), $As_2O_3$ or $Sb_2O_3$. For example, the tin oxide intent is between 0.02-0.3 mol percent. In one embodiment, the composition comprises an alkali-free glass comprising in mol percent on an oxide basis:

$67 \leq SiO_2 \leq 70$ $11 \leq Al_2O_3 \leq 13.5$ $3 \leq B_2O_3 \leq 6$ $3.5 \leq MgO \leq 7$ $4 \leq CaO \leq 7$ $1 \leq SrO \leq 4$ $0 \leq BaO \leq 3$ $0 \leq SnO_2 \leq 0.3$ $0 \leq CeO_2 \leq 0.3$ $0.00 \leq As_2O_3 \leq 0.5$ $0.00 \leq Sb_2O_3 \leq 0.5$ $0.01 \leq Fe_2O_3 \leq 0.08$ $F+Cl+Br \leq 0.4$ wherein $1.05 \leq (MgO+BaO+CaO+SrO)/Al_2O_3 \leq 1.25$     a)

$0.7 \leq (CaO+SrO+BaO)/Al_2O_3 \leq 0.9$     b)

$0.35 \leq MgO/(CaO+SrO+BaO) \leq 0.55$     c)

where $Al_2O_3$, MgO, CaO, SrO and BaO represent the mol percents of the representative oxide components.

In one embodiment, glasses within the disclosed ranges are substantially free of arsenic oxide ($As_2O_3$) or antimony oxide ($Sb_2O_3$) such that the concentration of either or both of these oxides is less than 0.05 wt %. When this is the case, it may be preferable to add other multivalent oxides such as $SnO_2$, $Fe_2O_3$ and/or $CeO_2$ to ensure a minimum number of gaseous inclusions in the final glass.

In an embodiment, the glass comprises less than about 1000 ppm of alkali metal oxides. in an embodiment, the glass comprises up to about 500 ppm $ZrO_2$. In an embodiment, the glass comprises 250- 800 ppm iron expressed as $Fe_2O_3$. In an embodiment, the glass' chemical fining agent is selected from the group consisting of: $SnO_2$, $Fe_2O_3$, $CeO_2$, $Sb_2O_3$, $As_2O_3$, or mixtures thereof.

In another embodiment, the glasses disclosed with the ranges contain 0.5-3 mol percent BaO. In yet another embodiment, the MgO level is between 3.8-7 mol percent.

In one embodiment, the glasses of the present disclosure exhibit a density less than 2.6 g/cc. In another embodiment the glasses exhibit densities of less than 2.56 g/cc. In yet another embodiment, the glasses exhibit densities of less than 2.55 g/cc.

Compositions falling within the above defined ranges are shown in Table 2.

As indicated in the table, glasses within the disclosed ranges have a viscosity at the liquidus temperature of at least 100 kpoise, and therefore are compatible with fusion as practiced today, or can be made compatible with fusion with minimal adjustment to current processes. Several of the examples have quite high liquidus viscosities, greater than 200 kpoise, and such high values for liquidus viscosity are considered important for long-term manufacturing on a single production line. For reference, the liquidus viscosity of a widely commercialized a-Si substrate, Eagle XGT™ (Corning Incorporated, Corning N.Y.) is approximately 230 kpoise. Therefore, in one embodiment, the glasses of the present disclosure have a viscosity at the liquidus temperature (liquidus viscosity) of greater than 100 kpoise; greater than 200 kpoise in another embodiment and greater than 220 kpoise in yet another embodiment.

Production a-Si substrate glasses such as Eagle XG™ and its arsenic containing predecessor, Eagle 2000™ (Corning Incorporated, Corning N.Y.) have exhibited temperatures at 200 poise viscosity between approximately 1605° C. and 1650° C., respectively. The rate of refractory and electrode corrosion is a strong function of temperature, so maintaining melter temperatures within this range is critical to asset lifetime. Furthermore, if melting temperatures are too high, then the efficiency of the finer is reduced and there is increased risk of gaseous inclusions in the ware. As is clear from the Table, glasses within the disclosed ranges have 200 poise temperatures less than 1650° C., and therefore are within the accepted envelope for long-term manufacturing. In another embodiment, glasses of the present disclosure exhibit 200 poise temperatures of less than 1630° C.

The temperature corresponding to 35 kpoise viscosity is an important metric because this is the approximate viscosity at which glass is delivered to the isopipe in the fusion process. Higher delivery temperatures result in higher rates of isopipe distortion (sag) due to creep of the refractory material used to make the isopipe. Recent advances in the chemistry and structure of zircon refractories have pushed up the highest acceptable temperature to obtain a minimum 3 year isopipe lifetime to about 1275° C., though lower temperatures are invariably preferable. As is clear from Table 2, glasses within the disclosed ranges have temperatures at 35 kpoise less than 1275° C., and thus satisfy this requirement for asset lifetime. In another embodiment the glasses of the present disclosure have temperatures at 35 kpoise of less than 1260° C.; in a further embodiment, less than 1250° C.

The annealing point required to produce low levels of compaction in low-temperature polysilicon processes, such as the laser recrystallization process, depends upon the details of the process, and is difficult to predict without running glasses with a variety of annealing points through the thermal cycle of interest. Broadly speaking, if there is no more than a single heat treatment step above about 450° C., and if the total exposure time at elevated temperature is no more than about 10 minutes, and if the peak temperature is between about 550° C. and 650° C., then an annealing point between 750° C. and 770° C. will result in compaction of approximately 20 ppm or less. Thereby, the glasses of the present disclosure display anneal points of between 750° C. and 770° C. in one embodiment and between 755° C. and 770° C. in another embodiment.

Figure 2:
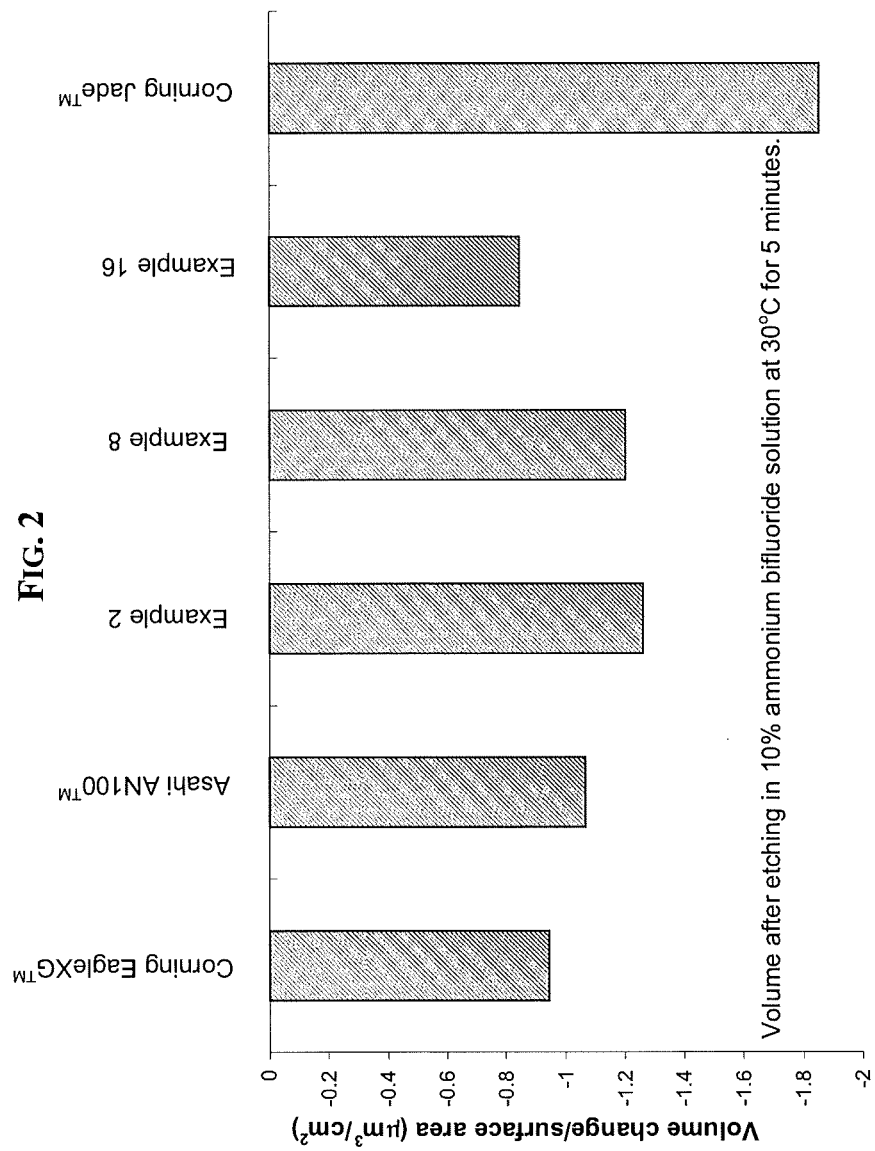
FIG. 2 shows the volume change per unit area for glasses etched in 10% ammonium bifluoride ($NH_4.HF$) for 5 minutes at 30° C. Glasses of the present disclosure are compared to commercially available glasses sold for both a-Si as well as p-Si applications.

Weight has long been a concern in mobile electronics, and in fact was a major design criterion in the development activities for both Eagle2000™ and EagleXG™. In most current designs, the entire purpose of the substrate in the final device is to support the TFT array, and so panel makers have taken to thinning substrates after TFT fabrication to reduce weight. The higher the density of the glass, the more thinning required to obtain equivalent final weight. Jade™ has a higher density than any commercially available a-Si substrate glass, and as a result has to be thinned more than such glasses to obtain a panel of equivalent weight. As such, the glasses of the present disclosure exhibit densities of less than 2.6 g/cc. Unfortunately, the low $B_2O_3$ content of Jade™ results in very different acid durability than is obtained for conventional amorphous silicon substrates, and thus acid etch lines designed for such substrates cannot be easily used to handle Jade™. FIGS. 1 and 2 compare volume loss per unit area for a wide range of alkali-free substrate glasses for a-Si (Corning EagleXG™ and Asahi AN100™) and p-Si applications (Corning Jade™ and Examples 2, 8, and 16). The glasses of the present disclosure show durability results that are much more like those seen for a-Si substrates than for Jade™, the only commercially-available p-Si substrate made using a down-draw process. Notably, in ammonium bifluoride, the a-Si substrate etch rate is approximately $1.1 \pm 0.25 \, \mu m^3/cm^2$. In one embodiment, the representative glasses of the present disclosure will also have an equivalent etch rate range. Likewise, for 1% $HF/10\% HNO_3$ for a-Si substrates, the etch rate is approximately $6.4 \pm 0.3 \, \mu m^3/cm^2$. In one embodiment, the representative glasses of the present disclosure will also have an equivalent etch rate range.

Each oxide constituent in the disclosed glasses serves an important purpose. Silica, or $SiO_2$, is the primary glass forming oxide, and contributes viscosity to the molten glass. For a given liquidus temperature, increasing viscosity serves to increase liquidus viscosity, and thus to improve compatibility with the fusion process. However, if viscosity becomes too high, then melting-related defects such as fining bubbles may appear, and erosion of refractories and degradation of platinum may become too extreme to permit long-term manufacturing in a continuous process. Furthermore, as silica increases, the liquidus temperature may increase due to increasing stability of cristobalite, a crystalline polymorph of $SiO_2$ that is an undesirable devitrification phase in a continuous process. Compared to every oxide except boron oxide ($B_2O_3$), $SiO_2$ decreases density and coefficient of thermal expansion, and relative to $B_2O_3$ it improves durability. Accordingly, $SiO_2$ ranges between 67 and 70 mol % in the glasses of the present disclosure, in one embodiment, and between 68 and 70 mol % in yet another embodiment.

Aluminum oxide, or $Al_2O_3$, also serves as a glass former in the inventive glasses. Like $SiO_2$, it contributes viscosity, and when carefully balanced against $SiO_2$ concentration and the relative and absolute concentrations of alkaline earths, can be used to reduce liquidus temperature, thus enhancing liquidus viscosity. An increase in $Al_2O_3$ relative to every oxide except $SiO_2$ results in improved durability in the kinds of acid-based etchants commonly used to etch display glasses in amorphous-silicon-based etching processes. Like $SiO_2$, an increase in $Al_2O_3$ relative to the alkaline earths generally results in decreased density, decreased coefficient of thermal expansion, and improved durability. Of particular importance, increasing $Al_2O_3$ at the expense of any component save SiO$_2$ will generally increase the anneal point, and thus a minimum amount of Al$_2$O$_3$ is required to obtain the high anneal points required for the polysilicon application. Because of the need to balance Al$_2$O$_3$ against other oxides, in one embodiment the Al$_2$O$_3$ content of the disclosed glasses is between 11 and 13.5 mol %. In another embodiment the range is 12-13 mol %.

Boron oxide, or B$_2$O$_3$, is also a glass-forming oxide, and is used to reduce viscosity and, more importantly, to reduce liquidus temperature. In general, an increase in B$_2$O$_3$ of 1 mol % decreases the temperature at equivalent viscosity by 10-14° C., depending on the details of the glass composition and the viscosity in question. However, B$_2$O$_3$ can lower liquidus temperature by 18-22° C. per mol %, and thus has the effect of decreasing liquidus temperature more rapidly than it decreases viscosity, thereby increasing liquidus viscosity. If one were to move outside the disclosed ranges to lower B$_2$O$_3$ contents, keeping all other oxides within their respective ranges, it would be difficult if not impossible to obtain a liquidus viscosity as high as 100 kpoise, or more preferably greater than 100 kpoise, or more preferably greater than 130 kpoise, a prerequisite for compatibility with the fusion process as practiced today. If one were to increase boron oxide concentration at the expense of other glass components, CTE and density will generally decrease, but anneal point will decrease sharply, by as much as 14° C. per mol %, which is highly detrimental for p-Si substrate applications. On the other hand, relative to the other components that can reduce viscosity, principally the alkaline earth oxides, increasing boron oxide actually improves durability in fluoride-containing acids, making the glass more compatible with etching processes designed for a-Si substrate glasses. For these reasons, in one embodiment B$_2$O$_3$ is kept between 3 and 6 mol %. In another embodiment, B$_2$O$_3$ ranges between 3 and 5 mol %.

Alkaline earth oxides, MgO, CaO, SrO and BaO (also referred cumulatively as "RO"), are essential constituents for manufacturing. Like B$_2$O$_3$, increasing alkaline earths relative to SiO$_2$ or Al$_2$O$_3$ decreases the viscosity of a glass melt at fixed temperature. Since high temperature is the main factor limiting the lifetimes of glass tanks and forming equipment, it is always desirable to reduce melting and forming temperatures as much as possible consistent with delivering an appropriate suite of glass properties. Unlike SiO$_2$, Al$_2$O$_3$ and B$_2$O$_3$, increases in alkaline earths relative to the glass forming components generally degrade properties that are important for p-Si applications: CTE and density generally increase as alkaline earth oxides increase relative to SiO$_2$, Al$_2$O$_3$ and B$_2$O$_3$, anneal point generally decreases, and durability moves increasingly far from standard a-Si substrate glasses. The only final glass property that benefits from higher alkaline earth concentration is Young's modulus, and for some combinations of alkaline earth increases, specific modulus may also benefit. Young's modulus determines the stiffness of a sheet of glass, and thus making it as high as possible is valuable for glass handling. At fixed temperature, the sag of a sheet of glass with widely spaced supports beneath it is dictated by the specific modulus, or the ratio of Young's modulus and density. High alkaline earth concentrations generally increase density, and therefore work against the expected increase in Young's modulus. However, MgO and CaO increase density much more slowly than the large alkaline earths, Sr and Ba, and thus the relative proportions of the alkaline earths can be manipulated to obtain an optimal combination of Young's modulus and density, consistent with fusion compatibility. In the disclosed glasses, the Young's modulus ranges from approximately 10.8 Mpsi to 12.1 Mpsi.

Mixtures of alkaline earths are also required to obtain low liquidus temperatures. The reasons behind this are complex. Without being bound by theory, the disclosed ranges for the various alkaline earths have the effect of putting two or more crystalline phases on the liquidus for most glasses within the inventive ranges, one of which is cristobalite (SiO$_2$), and one of which is an alkaline earth aluminosilicate. In barium-rich glasses, the alkaline earth aluminosilicate is often hexacelsian and solid solutions therein, expressed approximately as Ba$_{1-x-y}$Sr$_x$Ca$_y$Mg$_z$Al$_{2-x}$Si$_{2+z}$O$_8$, where x, y and z are generally less than 0.5. In glasses with low barium concentrations, and thus correspondingly high CaO+SrO concentrations, the alkaline earth aluminosilicate is often anorthite or solid solutions therein, expressed approximately as Ca$_{1-x-y}$Sr$_x$Ba$_y$Al$_2$Si$_2$O$_8$. For Mg-rich compositions, the liquidus phase is sometimes cordierite or solid solutions therein, approximately Mg$_2$Al$_4$Si$_5$O$_{18}$. The best liquidus temperatures are generally obtained when two or more different aluminosilicate phases and cristobalite are on or close to the liquidus temperature. The relative competition of each phase for glass constituents has the effect of destabilizing other phases, and thus reduces not only the liquidus temperature, but the tendency to devitrify when undercooled in a manufacturing process.

When the ratio of alkaline earths to Al$_2$O$_3$ falls below about 1.0, it can be very difficult if not impossible to eliminate gaseous inclusions from the glass (see e.g. U.S. Pat. No. 7,709,406). Furthermore, at such low RO/Al$_2$O$_3$ ratios, the viscosity of a glass with fixed SiO$_2$ and B$_2$O$_3$ content will be very high compared to a glass with higher RO/Al$_2$O$_3$ ratio. One way to reduce viscosity at low RO/Al$_2$O$_3$ ratio is to increase MgO relative to the other alkaline earths. However, this can have the effect of stabilizing the aluminosilicate mineral mullite, which not only causes a dramatic increase in liquidus temperature, but is very easy to nucleate from undercooled liquids. By keeping the concentration of CaO+SrO+BaO high relative to Al$_2$O$_3$, mullite can be avoided while still maintaining an elevated level of MgO. For this reason and in one embodiment, the ratio MgO/(CaO+SrO+BaO) of the disclosed glasses is between 0.3 and 0.6, in another embodiment, the range is between 0.35 and 0.55 and the molar ratio (CaO+SrO+BaO)/Al$_2$O$_3$ of the disclosed glasses is between 0.7 and 0.9.

The alkaline earth oxide with the greatest beneficial impact on liquidus temperature is barium oxide, BaO. Unfortunately, it also has the effect of increasing melting and delivery temperatures when substituted for any other alkaline earth oxide, and compromises final glass properties such as density, CTE and anneal point more so than any other alkaline earth oxide. Strontium oxide, SrO, can be increased at the expense of barium to offset some of these deleterious effects, but with much diminished benefit to liquidus temperature. Because hexacelsian is substantially a barium-strontium aluminosilicate, with comparatively low CaO and BaO, it is generally desirable to have CaO concentrations comparable to the combined concentration of BaO+SrO. As a result of these considerations, the disclosed glasses, in one embodiment will have BaO between 0.5 and 3 mol %, and in another embodiment between 1 and 2.5 mol %; SrO between 1 and 4 mol % in one embodiment, and between 2 and 3.5 mol % in another embodiment; and CaO between 4 and 7 mol % in one embodiment, and between 5 and 6 mole % in another embodiment. Compositions within these limits have attractive physical properties, but generally also have relatively low melting and delivery temperatures and liquidus viscosities suitable for down draw processes such as the fusion process.

Even if the melting temperature is very low, the details of the melting equipment may make it difficult to clear gaseous inclusions from a glass melt. Those that remain appear as defects in the final ware. Polysilicon TFT manufacturers are extremely sensitive to defects that distort the surface of a sheet of glass, and since one cannot predict where a gaseous inclusion will end up relative to the surface of a sheet, gaseous inclusions must be avoided at all cost. Furthermore, for processing simplicity, TFT manufacturers often seek to have color filter glass made from the same substrate material used in the TFT manufacturing process, in which case gaseous inclusions can block pixels, thereby compromising performance of the entire device. To clear gaseous defects from the glass melt before it is made into sheet, it is conventional to add fining agents. Fining agents are multivalent cations or halides that release gas at high temperature. Exemplary multivalent fining agents include, but are not limited to, $As_2O_3$, $Sb_2O_3$, $SnO_2$, and $Fe_2O_3$. Waste streams containing arsenic and antimony are considered hazardous materials in some countries, and for this reason is may be desirable to limit their concentrations in the disclosed glass. In one embodiment of the disclosed glasses, $As_2O_3$, $Sb_2O_3$, or combinations thereof are kept at a level of 500 ppm (0.05 wt %) or less.

Halogens that find use as fining agents include F, Cl and Br. Waste streams that contain halogens may also be regarded as hazardous materials in some countries, and their release during melting processes can cause excessive corrosion of steel ductwork and supports. On the other hand, melt systems can be designed to safely handle off-gas of halogens, and various choices of raw materials can be used to influence their retention in the final glass. Halogens are typically added as stable salts, which may include, but are not limited to, simple salts and hydrated salts of the alkaline earths or aluminum, such as $MgF_2$, $CaF_2$, $SrF_2$, $BaF_2$, $MgCl_2$, $CaCl_2$, $SrCl_2$, $BaCl_2$, $MgCl_2.4H_2O$, $CaCl_2.4H_2O$, $SrCl_2.4H_2O$, $BaCl_2.4H_2O$, $MgBr_2$, $CaBr_2$, $SrBr_2$, $BaBr_2$, $MgBr_2.4H_2O$, $CaBr_2.4H_2O$, $SrBr_2.4H_2O$, $BaBr_2.4H_2O$, $AlCl_3$, $AlCl_3.6H_2O$, and other forms familiar to those skilled in the art of raw material selection. Fining is generally optimized at a relatively low level of halogen addition, and thus in one embodiment, the glasses of the present disclsoure have F+Cl+Br concentrations between 0 and 0.4 mol %. In one embodiment, F+Cl+Br is less than 200 ppm, or 0.02 wt %.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Table 1 shows an example of an exemplary glass composition of the present disclosure, and a particular selection of raw materials for making it. As is known to those skilled in the art of glass manufacture, the particular choice of raw materials does not impact the final glass composition as the original raw materials are transformed into a single, uniform glass by the melting process. However, the actual choice of raw materials may be different than indicated in light of the particular requirements imposed by the limitations of a particular melting system, or by the cost of the raw materials, or both.

TABLE 1

| Primary oxide | Oxide target (mol %) | Raw material | Raw Material Weight |
|---|---|---|---|
| $SiO_2$ | 69.2 | Sand, −100 mesh | 1864.82 |
| $Al_2O_3$ | 12.1 | Alumina, −200 mesh | 550.62 |
| $B_2O_3$ | 3.8 | Boric acid | 209.65 |
| MgO | 5 | magnesia (periclase) | 88.97 |
| CaO | 5.35 | Precipitated calcium carbonate | 243.95 |
| SrO | 2.5 | Strontium carbonate | 164.67 |
| SrO | 0.4 | strontium nitrate | 38.33 |
| BaO | 1.5 | barium carbonate | 132.9 |
| $SnO_2$ | 0.1 | tin (IV) oxide | 6.62 |
| $Fe_2O_3$ | 0.03 | iron (II) oxalate | 3.43 |
| $ZrO_2$ | 0.02 | zirconium dioxide | 1.8 |

The primary source of $SiO_2$ is sand. The sand can be obtained from one or more of a variety of sources, including sand deposits (beaches or dunes), sandstone, quartzite, or other sources known to those skilled in the art of raw material selection. Sand is often the primary source of alkali contamination in what would otherwise be alkali-free glasses, and therefore a careful selection of source material may be important to minimize this important contaminant. The size of the sand particles may influence the rate of melting, and in particular large sand grains may fail to melt completely, appearing in the wear as a knot or stone. To avoid this, it is generally preferable for more than 90% of all sand grains to pass through a standard #80 U.S. standard mesh size. Alumina itself is generally the least expensive raw material to add $Al_2O_3$ to a glass, but other materials such as the aluminosilicate kaolin or hydrous forms of alumina or polymorphs of $Al_2O_3$ can be used instead when raw material costs are less important. $B_2O_3$ can be batched as the boric anhydride (approximately 94+% $B_2O_3$, the balance being mostly $H_2O$) or boric acid, approximately $B(OH)_3$.

MgO is generally added as its oxide, while the other alkaline earths are typically batched as carbonates. Suitable carbonate sources for CaO include limestone and precipitated calcium carbonate (a refined limestone product). MgO can be batched with CaO in the form of dolomite, though this may also increase the amount of iron in the glass, and so may be undesirable as compared to a more predictable pure iron source. Most of the strontium and barium will generally be added as carbonates obtained by industrial chemical processes. However, to keep the batch adequately oxidized, it is generally desirable to include a nitrate source as well. Strontium nitrate is indicated in the batch, but barium nitrate will work just as well. In both cases, it is generally desirable to batch no more than about 1 mol % of the alkaline earth oxide as nitrates to reduce $NO_x$ emissions, but in other ways nitrates may assist melting, so the exact amount that will work best is generally the subject of trial-and-error investigation.

$SnO_2$ is included in its usual role as a fining agent. More $SnO_2$ generally equates to improved fining capacity, but as it is a comparatively expensive raw material, it is desirable to add no more than is required to drive gaseous inclusions to an appropriately low level. The $SnO_2$ level of the inventive glass is preferably between 0.02 and 0.3 mol %.

A low amount of $ZrO_2$ (zirconia) is included in this example. It serves no practical role in the melting or fining behavior of the glass, and imparts no interesting properties at such a low level. It is useful to include it in a laboratory-scale batch, however, because it will be introduced by contact of hot glass with zirconia-based refractory materials in the melter, and thus monitoring its level in the glass may be important to judging the rate of tank wear over time.

The batch shows a low level of iron added in the form of iron oxalate. The total amount of iron will be greater than indicated, however, because of tramp levels in other raw materials, particularly sand. Iron is potentially useful in managing permeation blisters and in controlling $SO_2$ blisters, but can impart color to the glass if it becomes too oxidized. In one embodiment, the level of iron is between 0.02 and 0.08 wt % to obtain the best balance between gaseous inclusion management and excessive color.

A significant amount of water accompanies boric acid and sand, and a significant amount of carbon dioxide accompanies the carbonate raw materials. $CO_2$ is sparingly soluble in glass, so most of it is lost in the earliest stages of melting, and that which is trapped in gaseous inclusions is generally moved by action of the fining agent, e.g., $SnO_2$ in the present example. A significant level of water may be retained in the glass, however, in the form of dissolved $OH^-$ ions. This results in a measurable $OH^-$ vibrational band near $3600 cm^{-1}$ in the near infrared. The intensity of this band above background through a 1 mm thick path length is referred to as beta-OH. It generally ranges from as low as 0.2 to as high as 0.7 in conventional amorphous silicon substrate glasses. Dissolved $OH^-$ has a large impact on the annealing point for alkali-free glasses, and therefore it is desirable to keep $OH^-$ as low as reasonably achievable for any given glass. Conventional electric-boost melters generally employ burners above the glass surface that generate a high water partial pressure and result in higher levels of water incorporation into the glass. Halides can be used to reduce the retained water level, and boosting the power delivered via electrodes and reducing the power delivered via burners can also help. Likewise, selecting a comparatively dry sand can produce enough of a change in dissolved $OH^-$ to significantly impact annealing point. Beta-OH for the inventive glass is preferably less than 0.55, more preferably less than 0.5, and most preferably less than 0.45 to maximize the annealing point of the final glass.

While the actual composition and the choice of raw materials in this example is quite specific, it will be obvious to one skilled in the art that alternative raw materials can be used to obtain the same final glass composition, and thus a particular set of raw materials must be selected so as to be best suited for a given melting/fining/forming process. Any other set of raw materials that results in an equivalent composition will therefore produce a glass that satisfies the basic requirement of high annealing point, low density, low CTE, and high durability required for low-temperature polysilicon applications.

Further and although the intended use for the disclosed glasses is in p-Si applications, it should be noted that the glasses may also be considered for a-Si, color filter substrate or other applications where the disclosed properties may be deemed advantageous.

Example

Preparation of a Test Sample

In order to best approximate conditions exhibited by localized laser crystallization heating, the samples of glass made from the components disclosed in Table 1 were mixed, melted and drawn into 1 mm thick sheet. The sample is then cut in half lengthwise, leaving one reference portion, and another portion that undergoes heat treatment(s). The reference piece and the heat-treated piece were examined together under a microscope, and dimensional changes are measured resulting from the heat treatment using the Mitutoyo Quick Vision QV202 Pro. The heat-treated glass sample was next subjected to 590° C. heat treatment for 45 minutes. After such treatment, the tested glass exhibited a dimensional change of −60 ppm. Ideally, the glasses of the present disclosure will exhibit dimensional change of −80 ppm or less. Because the automated optical instrument makes several tens of repeat measurements on each sample, statistical methods can be used to determine dimensional changes as low as 1 micron, corresponding to less than 10 ppm dimensional change in the sample.

In addition to low compaction, the glass must satisfy rigorous forming requirements to be applicable to fusion draw or related processes. Devitrification is defined as the formation of a crystalline phase from an initially homogeneous glass. The maximum temperature at which crystals coexist with glass is defined as the liquidus temperature. Liquidus temperature is measured by loading a crushed glass sample into a platinum boat, then heating for 72 hours in a tube furnace with a gradient of 10° C. or more per cm. The viscosity of the glass at the liquidus temperature is referred to as the liquidus viscosity. Precision sheet glass forming processes generally require comparatively high liquidus viscosities, for example, greater than 40,000 poise.

The glass must also satisfy rigorous melting requirements for production purposes. The temperature at which glass batch constituents melt in a economically reasonable amount of time, and the temperature at which trapped bubbles of air can rise out of the glass in a reasonable amount of time, typically corresponds to a viscosity of about 200 poises. Limitations in durable refractory or precious metal containers at high temperatures place an upper practical limit for 200 poises temperature of about 1,680° C. As noted, the glasses of the present disclosure exhibit 200 poise temperature below 1650° C. It is possible that changes in batch materials from those conventionally used would allow more viscous glasses to be melted at proportionately higher viscosities, but such materials invariably add formidable costs, and transporting glass through a melting and conditioning system at high viscosity presents significant technical challenges. As noted, numerous glass compositions with their physical properties are presented in Table 2.

The remainder of properties listed in Table 2 are achieved through standard tests that are well known to those of skill in the industry.

TABLE 2

|  | 1 | 2 | 3 | 4 | 5 | 6 | 7 |
| --- | --- | --- | --- | --- | --- | --- | --- |
| Composition (mol %) | | | | | | | |
| $SiO_2$ | 68.11 | 68 | 67.83 | 67.86 | 69.14 | 68.56 | 68.13 |
| $Al_2O_3$ | 12.38 | 12.5 | 12.43 | 12.33 | 11.74 | 12.11 | 12.25 |

TABLE 2-continued

|  | | | | | | | |
|---|---|---|---|---|---|---|---|
| $B_2O_3$ | 4.65 | 4.68 | 4.53 | 4.46 | 4.62 | 4.63 | 4.6 |
| MgO | 4.56 | 4.56 | 4.99 | 5.19 | 4.92 | 4.86 | 4.85 |
| CaO | 5.94 | 5.91 | 5.13 | 5.09 | 4.84 | 5.37 | 5.21 |
| SrO | 2.75 | 2.74 | 3.55 | 3.55 | 3.17 | 3.11 | 3.6 |
| BaO | 1.5 | 1.5 | 1.4 | 1.4 | 1.45 | 1.24 | 1.24 |
| $SnO_2$ | 0.07 | 0.07 | 0.09 | 0.08 | 0.08 | 0.09 | 0.08 |
| $Fe_2O_3$ | 0.02 | 0.02 | 0.03 | 0.03 | 0.03 | 0.03 | 0.03 |
| $ZrO_2$ | 0.03 | 0.03 | 0.01 | 0.01 | 0.01 | 0.01 | 0.01 |
| $RO/Al_2O_3$ | 1.19 | 1.18 | 1.21 | 1.24 | 1.22 | 1.20 | 1.22 |
| $(CaO + SrO + BaO)/Al_2O_3$ | 0.82 | 0.81 | 0.81 | 0.81 | 0.81 | 0.80 | 0.82 |
| MgO/(CaO + BaO + SrO) | 0.45 | 0.45 | 0.50 | 0.52 | 0.52 | 0.50 | 0.48 |
| Properties | | | | | | | |
| strain (fiber) | 711 | 711 | 708 | 703 | 704 | 703 | 706 |
| anneal (fiber) | 765 | 765 | 761 | 757 | 758 | 757 | 759 |
| Soft | 996.6 | 997.7 | 995.8 | 996.9 | 997.6 | 996.7 | 996.7 |
| Density | 2.538 | 2.541 | 2.554 | 2.556 | 2.535 | 2.534 | 2.547 |
| strain (BBV) | 712 | 713.7 | 708.5 | 708 | 705.5 | 705.4 | 706.4 |
| anneal (BBV) | 763.2 | 764.7 | 760 | 759.3 | 757.1 | 757.5 | 758.5 |
| $10^{12}$ (BBV) | 802.4 | 803.5 | 799.2 | 798.2 | 796.1 | 797.5 | 798.7 |
| soft (PPV) | 993.3 | 994.7 | 990.8 | 990.8 | 994.9 | 989.9 | 991.2 |
| RT-300° C. CTE (fiber elongation) | 35.5 | 35.9 | 35.4 | 36.3 | 35.4 | 35.4 | 36 |
| Poisson ratio | n.a. | n.a. | 0.238 | 0.24 | 0.241 | 0.239 | 0.241 |
| Shear Modulus (GPa) | n.a. | n.a. | 32.8 | 32.9 | 32.4 | 32.7 | 32.8 |
| Young's modulus (GPa) | n.a. | n.a. | 81.3 | 81.6 | 80.5 | 81 | 81.4 |
| specific modulus (GPa/(g/cc)) | n.a. | n.a. | 31.8 | 31.9 | 31.8 | 32 | 32 |
| T at 200 poise | 1623 | 1622 | 1619 | 1617 | 1643 | 1630 | 1623 |
| T @ 35 kpoise | 1250 | 1249 | 1247 | 1246 | 1260 | 1253 | 1249 |
| 72 h gradient boat internal liquidus | 1160 | 1180 | 1165 | 1155 | 1170 | 1160 | 1170 |
| internal liquidus viscosity | 2.5E+05 | 1.5E+05 | 2.1E+05 | 2.6E+05 | 2.4E+05 | 2.7E+05 | 1.9E+05 |

|  | 8 | 9 | 10 | 11 | 12 | 13 | 14 |
|---|---|---|---|---|---|---|---|
| Composition (mol %) | | | | | | | |
| $SiO_2$ | 68.5 | 68.36 | 67.94 | 67.62 | 68 | 68.08 | 68.63 |
| $Al_2O_3$ | 12.15 | 12.33 | 12.42 | 12.53 | 12.33 | 12.47 | 12.41 |
| $B_2O_3$ | 4.43 | 4.42 | 4.39 | 4.92 | 4.58 | 4.58 | 4.1 |
| MgO | 4.95 | 4.86 | 5.23 | 4.07 | 4.89 | 5 | 4.53 |
| CaO | 5.25 | 5.88 | 5.26 | 6.68 | 5.94 | 5.65 | 6.02 |
| SrO | 3.47 | 3.13 | 3.57 | 1.9 | 2.93 | 2.65 | 2.41 |
| BaO | 1.09 | 0.87 | 1.06 | 2.17 | 1.2 | 1.45 | 1.74 |
| $SnO_2$ | 0.1 | 0.1 | 0.09 | 0.05 | 0.07 | 0.07 | 0.1 |
| $Fe_2O_3$ | 0.03 | 0.03 | 0.03 | 0.01 | 0.02 | 0.02 | 0.03 |
| $ZrO_2$ | 0.03 | 0.03 | 0.02 | 0.05 | 0.03 | 0.03 | 0.03 |
| $RO/Al_2O_3$ | 1.21 | 1.20 | 1.22 | 1.18 | 1.21 | 1.18 | 1.18 |
| $(CaO + SrO + BaO)/Al_2O_3$ | 0.81 | 0.80 | 0.80 | 0.86 | 0.82 | 0.78 | 0.82 |
| MgO/(CaO + BaO + SrO) | 0.50 | 0.49 | 0.53 | 0.38 | 0.49 | 0.51 | 0.45 |
| Properties | | | | | | | |
| strain (fiber) | 708 | 710 | 710 | 710 | 711 | 705 | 718 |
| anneal (fiber) | 761 | 763 | 763 | 764 | 765 | 759 | 771 |
| soft | 998.1 | 998 | 998.2 | 1000.3 | 996.5 | 998.7 | 1005.2 |
| density | 2.541 | 2.532 | 2.547 | 2.522 | 2.538 | 2.539 | 2.547 |
| strain (BBV) | 708.9 | 710.2 | 710.7 | 710.6 | 709 | 710 | 715.1 |
| anneal (BBV) | 761 | 761.3 | 761.5 | 762.5 | 760.5 | 761.5 | 767 |
| $10^{12}$ (BBV) | 801 | 800.1 | 800.1 | 802.8 | 800.3 | 801.3 | 806.9 |
| soft (PPV) | 995.9 | 994.4 | 992.9 | 998.9 | 994.5 | 1002.5 | 1004 |
| RT-300° C. CTE (fiber elongation) | 35.3 | 35.4 | 36.7 | 35 | 35.8 | 35 | 36.4 |
| Poisson ratio | 0.237 | 0.234 | 0.24 | 0.226 | n.a. | n.a. | 0.23 |
| Shear Modulus (GPa) | 32.8 | 32.9 | 33 | 32.5 | n.a. | n.a. | 32.9 |
| Young's modulus (GPa) | 81.2 | 81.3 | 81.9 | 79.7 | n.a. | n.a. | 80.9 |
| specific modulus (GPa/(g/cc)) | 32 | 32.1 | 32.2 | 31.6 | n.a. | n.a. | 31.8 |
| T at 200 poise | 1629 | 1623 | 1616 | 1619 | 1618 | 1622 | 1635 |
| T @ 35 kpoise | 1253 | 1251 | 1247 | 1247 | 1247 | 1250 | 1259 |
| 72 h gradient boat internal liquidus | 1170 | 1190 | 1180 | 1185 | 1180 | 1160 | 1185 |
| internal liquidus viscosity | 2.1E+05 | 1.3E+05 | 1.5E+05 | 1.3E+05 | 1.5E+05 | 2.5E+05 | 1.7E+05 |

|  | 15 | 16 | 17 | 18 | 19 | 20 |
|---|---|---|---|---|---|---|
| Composition (mol %) | | | | | | |
| $SiO_2$ | 69.53 | 69.24 | 68.96 | 68.94 | 69.5 | 69.39 |
| $Al_2O_3$ | 11.85 | 12.07 | 12.38 | 12.38 | 12.06 | 12.4 |

TABLE 2-continued

|  | | | | | | |
|---|---|---|---|---|---|---|
| B$_2$O$_3$ | 3.89 | 3.78 | 4.11 | 4 | 3.28 | 4.35 |
| MgO | 4.93 | 4.94 | 4.22 | 4.38 | 4.94 | 3.98 |
| CaO | 5.04 | 5.36 | 6.44 | 6.28 | 5.35 | 5.97 |
| SrO | 2.87 | 2.91 | 1.86 | 2.07 | 3.03 | 1.73 |
| BaO | 1.74 | 1.55 | 1.86 | 1.8 | 1.69 | 2.01 |
| SnO$_2$ | 0.11 | 0.11 | 0.11 | 0.11 | 0.1 | 0.1 |
| Fe$_2$O$_3$ | 0.03 | 0.03 | 0.03 | 0.03 | 0.02 | 0.02 |
| ZrO2 | 0.02 | 0.02 | 0.02 | 0.02 | 0.03 | 0.03 |
| RO/Al$_2$O$_3$ | 1.23 | 1.22 | 1.16 | 1.17 | 1.24 | 1.10 |
| (CaO + SrO + BaO)/Al$_2$O$_3$ | 0.81 | 0.81 | 0.71 | 0.70 | 0.83 | 0.71 |
| MgO/(CaO + BaO + SrO) | 0.51 | 0.50 | 0.82 | 0.82 | 0.49 | 0.78 |
| Properties | | | | | | |
| strain (fiber) | 715 | 715 | 711 | 718 | 713 | 718 |
| anneal (fiber) | 769 | 769 | 769 | 771 | 769 | 772 |
| soft | 1008 | 1006.7 | 1006.5 | 1006.4 | 1010.1 | 1012.8 |
| density | 2.549 | 2.547 | 2.539 | 2.542 | 2.555 | 2.53 |
| strain (BBV) | 718.5 | 718.4 | 715.9 | 716.9 | 717.1 | 720 |
| anneal (BBV) | 769.8 | 769.9 | 768.2 | 769 | 768.3 | 771 |
| 10$^{12}$ (BBV) | 808.8 | 809.2 | 807.2 | 807.7 | 807.6 | 811.6 |
| soft (PPV) | 1010 | 1007.2 | 1001.9 | 1003.4 | 1009.5 | 1009.6 |
| RT-300° C. CTE (fiber elongation) | 35.5 | 35.1 | 35.5 | 35.7 | 35.4 | 34.7 |
| Poisson ratio | 0.232 | 0.231 | 0.232 | 0.237. | 0.235 | 0.233 |
| Shear Modulus (GPa) | 32.7 | 32.8 | 4.75 | 4.76 | 33 | 4.72 |
| Young's modulus (GPa) | 80.7 | 80.8 | 11.71 | 11.78 | 81.6 | 11.65 |
| specific modulus (GPa/(g/cc)) | 31.7 | 31.7 | 31.8 | 32 | 31.9 | 31.7 |
| T at 200 poise | 1652 | 1645 | 1634 | 1633 | 1650 | 1646 |
| T @ 35 kpoise | 1267 | 1264 | 1258 | 1258 | 1268 | 1265 |
| 72 h gradient boat internal liquidus | 1175 | 1180 | 1180 | 1170 | 0 | 1170 |
| internal liquidus viscosity | 2.5E+05 | 2.1E+05 | 2.0E+05 | 2.5E+05 | 1.6E−21 | 2.8E+05 |

|  | 21 | 22 | 23 | 24 | 25 | 26 |
|---|---|---|---|---|---|---|
| Composition (mol %) | | | | | | |
| SiO$_2$ | 68.65 | 68.64 | 68.29 | 69.56 | 69.33 | 69.29 |
| Al$_2$O$_3$ | 12.54 | 12.57 | 12.55 | 12.35 | 12.24 | 12.23 |
| B$_2$O$_3$ | 3.82 | 3.85 | 3.69 | 4.23 | 4.27 | 4.28 |
| MgO | 5.13 | 5.14 | 5.54 | 5.03 | 5.14 | 5.09 |
| CaO | 5.72 | 5.69 | 5.56 | 5.42 | 5.55 | 5.48 |
| SrO | 2.53 | 1.73 | 1.78 | 2.1 | 2.15 | 2.36 |
| BaO | 1.47 | 2.24 | 2.46 | 1.17 | 1.19 | 1.13 |
| SnO$_2$ | 0.09 | 0.09 | 0.09 | 0.1 | 0.1 | 0.1 |
| Fe$_2$O$_3$ | 0.02 | 0.02 | 0.02 | 0.02 | 0.02 | 0.02 |
| ZrO2 | 0.03 | 0.03 | 0.03 | 0.02 | 0.02 | 0.02 |
| RO/Al$_2$O$_3$ | 1.18 | 1.18 | 1.22 | 1.11 | 1.15 | 1.15 |
| (CaO + SrO + BaO)/Al$_2$O$_3$ | 0.78 | 0.77 | 0.78 | 0.70 | 0.73 | 0.73 |
| MgO/(CaO + BaO + SrO) | 0.53 | 0.53 | 0.57 | 0.58 | 0.58 | 0.57 |
| Properties | | | | | | |
| strain (fiber) | 718 | 719 | 716 | 717 | 715 | 715 |
| anneal (fiber) | 773 | 772 | 771 | 771 | 769 | 768 |
| soft | 1007 | 1007 | 1003 | 1009.9 | 1009 | 1006.4 |
| density | 2.55 | 2.55 | 2.57 | 2.51 | 2.51 | 2.52 |
| strain (BBV) | | | | | | |
| anneal (BBV) | | | | | | |
| 10$^{12}$ (BBV) | | | | | | |
| soft (PPV) | | | | | | |
| RT-300° C. CTE (fiber elongation) | 35.2 | 34.8 | 35.5 | 32.8 | 33 | 33.4 |
| Poisson ratio | | | | | | |
| Shear Modulus (GPa) | | | | | | |
| Young's modulus (GPa) | | | | | | |
| specific modulus (GPa/(g/cc)) | | | | | | |
| T at 200 poise | 1629 | 1633 | 1622 | 1631 | 1631 | 1633 |
| T @ 35 kpoise | 1255 | 1259 | 1253 | 1256 | 1254 | 1252 |
| 72 h gradient boat internal liquidus | 1185 | 1175 | 1180 | 1210 | 1220 | |
| internal liquidus viscosity | 1.6E+05 | 2.2E+05 | 1.7E+05 | 9.2E+04 | 7.0E+04 | 2.8E−18 |

TABLE 2-continued

|  | 27 | 28 | 29 | 30 | 31 | 32 |
|---|---|---|---|---|---|---|
| Composition (mol %) | | | | | | |
| $SiO_2$ | 69.24 | 69.6 | 68.87 | 69 | 69.05 | 69.48 |
| $Al_2O_3$ | 12.32 | 12.18 | 12.47 | 12.42 | 12.39 | 12.4 |
| $B_2O_3$ | 4.43 | 4.38 | 4.48 | 4.42 | 4.41 | 4.35 |
| MgO | 3.99 | 3.94 | 4.05 | 3.91 | 3.96 | 3.96 |
| CaO | 6.1 | 6.03 | 6.17 | 6.42 | 6.32 | 5.77 |
| SrO | 1.78 | 1.76 | 1.8 | 1.83 | 1.83 | 1.67 |
| BaO | 1.75 | 1.73 | 1.77 | 1.85 | 1.87 | 2.22 |
| $SnO_2$ | 0.11 | 0.11 | 0.11 | 0.11 | 0.11 | 0.1 |
| $Fe_2O_3$ | 0.02 | 0.02 | 0.02 | 0.03 | 0.03 | 0.02 |
| $ZrO2$ | 0.03 | 0.03 | 0.03 | 0.02 | 0.02 | 0.03 |
| $RO/Al_2O_3$ | 1.11 | 1.11 | 1.11 | 1.13 | 1.13 | 1.10 |
| $(CaO + SrO + BaO)/Al_2O_3$ | 0.78 | 0.78 | 0.78 | 0.81 | 0.81 | 0.78 |
| MgO/(CaO + BaO + SrO) | 0.41 | 0.41 | 0.42 | 0.39 | 0.40 | 0.41 |
| Properties | | | | | | |
| strain (fiber) | 716 | 717 | 718 | 717 | 716 | 717 |
| anneal (fiber) | 771 | 772 | 771 | 771 | 770 | 772 |
| soft | 1010 | 1014.5 | 1010.9 | 1011.7 | 1008.8 | 1013.2 |
| density | 2.52 | 2.52 | 2.52 | 2.53 | 2.53 | 2.54 |
| strain (BBV) | 717 | 720 | 718 | 716 | 718 | |
| anneal (BBV) | 769 | 112 | 771 | 769 | 770 | |
| $10^{12}$ (BBV) | 810.5 | 813 | 811.5 | 810.1 | 811.2 | |
| soft (PPV) | 1010 | 1011.5 | 1010.5 | 1008 | 1009.2 | 1010 |
| RT-300° C. CTE (fiber elongation) | 33.7 | 34.3 | 33.7 | 34.5 | 34.4 | 34.6 |
| Poisson ratio | 0.24 | 0.23 | 0.23 | 0.24 | 0.23 | |
| Shear Modulus (GPa) | 4.73 | 4.72 | 4.73 | 4.72 | 4.74 | |
| Young's modulus (GPa) | 11.73 | 11.65 | 11.64 | 11.67 | 11.65 | |
| specific modulus (GPa/(g/cc)) | 32 | 31.9 | 31.8 | 31.8 | 31.7 | |
| T at 200 poise | 1648 | 1654 | 1649 | 1643 | 1642 | 1653 |
| T @ 35 kpoise | 1265 | 1269 | 1266 | 1261 | 1260 | 1267 |
| 72 h gradient boat internal liquidus | 1185 | 1195 | 1195 | 1175 | 1170 | 1175 |
| internal liquidus viscosity | 1.9E+05 | 1.7E+05 | 1.6E+05 | 2.2E+05 | 2.5E+05 | 2.6E+05 |

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A glass comprising:

$$67 \leq SiO_2 \leq 70$$

$$11 \leq Al_2O_3 \leq 13.5$$

$$3 \leq B_2O_3 \leq 6$$

$$3.5 \leq MgO \leq 7$$

$$4 \leq CaO \leq 7$$

$$1 \leq SrO \leq 4$$

$$0.5 \leq BaO \leq 3$$

$$0.02 \leq SnO_2 \leq 0.3$$

$$0 \leq CeO_2 \leq 0.3$$

$$0.00 \leq As_2O_3 \leq 0.5$$

$$0.00 \leq Sb_2O_3 \leq 0.5$$

$$0.01 \leq Fe_2O_3 \leq 0.08$$

$$F+Cl+Br \leq 0.4$$

wherein all oxides are in mol % and $$1.05 \leq (MgO+BaO+CaO+SrO)/Al_2O_3 \leq 1.25$$

$$0.7 \leq (CaO+SrO+BaO)/Al_2O_3 \leq 0.9$$

$$0.3 \leq MgO/(CaO+SrO+BaO) \leq 0.6$$

where $Al_2O_3$, MgO, CaO, SrO and BaO represent the mol percents of the representative oxide components.

2. The glass of claim 1 wherein Beta-OH is less than about 0.55.

3. A sheet of the glass of claim 1 made using a down-draw process.

4. A sheet of the glass of claim 3 wherein the down draw process is the fusion process.

5. A process of making the glass of claim 1 wherein the oxidation state of the batch materials used to make the glass is manipulated via nitrate additions to achieve an oxidation state such that 20 consecutive Gen 4 sheets are produced using a down draw process having gaseous inclusion levels of 0.2 defects per pound or less.

6. The glass of claim 1 wherein the glass is essentially free of alkali metal oxides.

7. The glass of claim 1 wherein the glass exhibits an anneal point of between 750° C. and 770° C.

8. A glass according to claim 1 wherein the glass comprises in mol percent on an oxide basis 68-70 $SiO_2$, 12-13 $Al_2O_3$, 3-5 $B_2O_3$, 4-6 MgO, 1-2.5 BaO, and 5-6 CaO.

9. The glass of claim 1 wherein the glass exhibits a Young's modulus of from 10.8-12.1 Mpsi.

10. The glass of claim 1 wherein the glass exhibits a liquidus viscosity of greater than 100 kpoise.

11. The glass of claim 1 wherein the glass exhibits a density of less than 2.6 g/cc.

12. The glass of claim 1 wherein the glass exhibits a temperature corresponding to a 35 kpoise viscosity of less than 1275° C.

13. The glass of claim 12 wherein the glass exhibits a temperature corresponding to a 35 kpoise viscosity of less than 1250° C.

* * * * *